Aug. 18, 1931.  M. H. REED  1,819,791
POWER UNIT ADAPTED TO BE APPLIED TO LAWN MOWERS
Filed Nov. 17, 1927
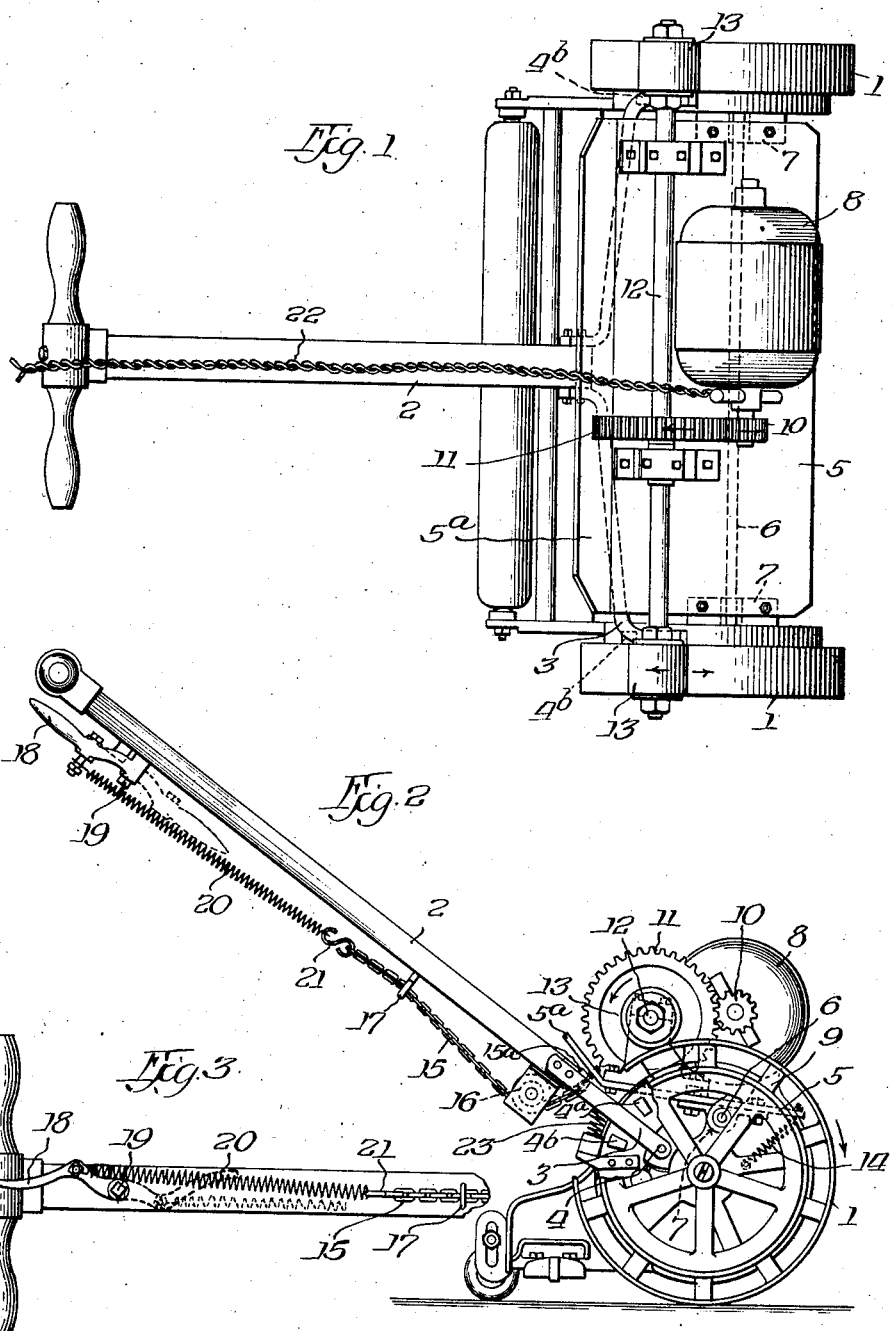

Patented Aug. 18, 1931

1,819,791

UNITED STATES PATENT OFFICE

MATTHEW HOWARD REED, OF CHICAGO, ILLINOIS

POWER UNIT ADAPTED TO BE APPLIED TO LAWN MOWERS

Application filed November 17, 1927. Serial No. 233,833.

This invention relates to a power unit designed for convenient mounting upon an existing lawn mower in relation to drive the same, and having means whereby it may be conveniently, at the will of the operator, moved into and out of driving relation.

The object of the invention is to provide a device of this kind which will be of simpler construction and more readily applied than previously known devices, one which will be relatively inexpensive, and which will be particularly effective in maintaining drive with the peripheries of the ground wheels of the lawn mower, and one in which the drive may be thrown in and out by either a control connector or by movement of the handle.

The invention proceeds upon the principle of mounting the power unit upon a bed plate which in turn is mounted in a manner to rock in the vertical longitudinal plane of travel, about a center, and thereby move frictional driving wheels into and out of driving contact with the ground wheels of the lawn mower; the bed plate being preferably trunnioned directly upon a tie rod or equivalent available member of the lawn mower eccentrically to the ground wheels of the lawn mower; and there being also upon the bed plate reduction gearing including the shaft of the frictional drive wheels, so positioned that when the bed plate rocks the frictional drive wheels move in an arc which while intersecting the periphery of a ground wheel, will nevertheless be at such a low angle thereto that the frictional drive will tend to draw the drive wheels into closer contact with the ground wheels of the lawn mower, the direction of rotation of the frictional drive wheels being such as to cooperate in producing the effect. Bed plate trunnion bearings are positioned to either balance the power unit in the direction to take its frictional drive wheels out of contact with the lawn mower wheels or to approximately overbalance in that direction so that a spring or springs may readily tip the power unit to a position which is out of driving contact; and to draw the power unit into driving contact, a flexible connector, with controlling means within convenient reach of the operator, is connected with the bed plate on opposite sides of the trunnion bearings from the spring.

To conveniently interrupt driving connection between the power unit and the ground wheel or wheels, for instance, when the mower is being manipulated to reverse its direction or change its course, the controlling handle is permitted to have a movement, for instance, in a vertical plane, in a path which causes it to encounter the power element and displace the latter from driving position; that is to say, position which it assumes in causing the drive wheel of the power unit to impinge against a ground wheel in transmitting drive from the power unit to the mower.

In the accompanying drawings—

Figure 1 is a top plan view;

Figure 2 is a side elevation; and

Figure 3 is a detail view of a lawn mower having a power unit applied thereto in accordance with the present invention.

1 represents the ground wheels of the ordinary conventional lawn mower, and 2 the handle through which the mower is controlled, and which is connected through means of the yoke 3 pivoted at 4 and limited in upward and downward swinging movement by the lugs 4a and 4b.

5 represents the bed plate of a power unit trunnioned upon a tie rod 6 of the lawn mower through the medium of strap-like trunnion bearings 7, and 8 represents an electric motor of any approved construction, mounted upon the bed plate 5 through means, for instance, of its base 9. Motor 8 has a power take-off pinion 10 meshing with the larger wheel 11 on the shaft 12, which is also mounted on the bed plate 5, and which extends across the power unit and carries at its outer ends drive wheels 13, preferably of frictional type, coacting in a novel and advantageous way with the peripheries of the lawn mower ground wheels 1 to drive the latter. That is to say, shaft 12 of frictional drive wheels 13 is so located with respect to the trunnion center 6 that the rocking of the bed plate 5 will cause the wheels 13 to move in an arc which, while intersecting the ground wheels 1, is at such a low angle relatively thereto that when the wheels 13 rotate in the direction of the arrows they will attempt to wedge themselves into closer frictional driving relation to the wheels 1 and thus insure efficient drive with a minimum application of rocking force in the bed plate 5.

In order to hold the bed plate 5 with its contained power and transmitting unit normally tipped in a direction to hold the frictional drive wheels 13 out of contact with the lawn mower wheels 1, the load of the power unit upon the bed plate is distributed so that the bed plate is approximately overbalanced forwardly and downwardly so that wheels 13 are held upward from the wheels 1; and in order to reinforce this tipping but nevertheless to leave the frictional drive wheels 13 free to draw themselves into closer frictional driving contact with wheels 1, so long as initial frictional contact is voluntarily established, the overbalance of the power unit is yieldingly increased by the action of a spring or springs 14. In order to rock the power unit in the opposite direction and establish frictional driving contact between wheels 13 and wheels 1, a flexible connector 15, connected at 15a to the upturned dash 5a of the bed plate 5, is passed around the pulley 16, through the eye 17, and to the dead center lever 18 which is pivoted at 19 upon the handle 2, an intermediate portion 20 of the flexible connection thus provided being made resilient, and a coupling 21 of some suitable form being introduced as a stop to coact with the eye 17 and limit movement of the flexible connector in the opposite direction, as suggested in dotted lines in Figure 3. When the dead center lever is swung to the dotted line position of Figures 2 and 3, flexible connector 15, 20 will assume a position permitting the power unit to rock under the influence of springs 14 and hold the wheels 13 out of contact with wheels 1; but when the dead center lever is moved to the full line position of Figures 2 and 3, the power unit will be held in driving relation to the lawn mower.

In addition to the flexible connector control, which is useful in permanently releasing the drive when the lawn mower is being taken to and from the place of use, the invention provides for handle control of the drive which is useful in temporarily interrupting drive, for instance, when turning corners, reversing direction, etc. To this end, the bed plate 5 is provided with an upturned dash 5a, so located in relation to the handle 2 or its yoke 3 that when the handle is lifted and the yoke moves toward lugs 4a, thereby bringing the handle slightly above a convenient or predetermined operating height, the dash 5a will be engaged and the bed plate 5 will be rocked sufficiently to remove the driving wheels 13 from the ground wheels 1 and interrupt the drive so long as the handle is held in the said raised position; and this interruption of the drive, by movement of the handle to an abnormal height, will follow even though the dead center lever 18 and the flexible connector 15 are in the full line position of Figures 2 and 3, in which they tend to establish driving relation between the drive wheels and the ground wheels. Inherent resiliency in the flexible connector permits downward movement of the handle through any desired arc, while the drive wheels are being held in contact with the ground wheels. Thus, there are two independent controls for the drive, appropriate to the two different circumstances under which it may be desirable to establish or relieve the drive, namely, when drive is to be interrupted for a relatively long period as when transferring the machine from one place to another, or when it is desired to interrupt and reestablish the drive momentarily and by mere manipulation of the handle as in drawing the machine backward, changing direction of travel, etc. From the foregoing, it will be apparent that in order that the drive wheels may remain in driving relation to the ground wheels, the handle must be in an approximately normal position of use. In order that the handle may not automatically assume this position when released by the operator and so continue the drive of the machine unattended, any suitable means may be provided for relieving the drive wheels when the handle is unattended. Some such means is herein shown as consisting of a compression spring or springs 23 so located between the yoke 3 and the fixed point or points on the frame of the machine, that the handle will be normally held elevated to a position in which the dash 5a will be engaged and the drive wheels removed from the ground wheels.

The power unit, if in the form of an electric motor, may be driven by current received from an extraneous source through cable 22.

I claim:

1. In combination with a lawn mower having ground wheels and a handle for controlling it, a power unit comprising a bed plate directly trunnioned upon the lawn mower, and a motor, said motor having a drive wheel moving by the trunnioning action of the bed plate into and out of driving contact with the ground wheel; the path of movement of said drive wheel toward the ground wheel intersecting the periphery of said ground wheel at a low angle, and the rotation of the drive wheel being in a direction which causes it to wedge itself upon the ground wheel.

2. In combination with a lawn mower having ground wheels and a handle for controlling it, a power unit comprising a bed plate directly trunnioned upon the lawn mower, and a motor, said motor having a drive wheel moving by the trunnioning action of the bed plate into and out of driving contact with a ground wheel; the path of movement of said drive wheel toward the ground wheel intersecting the periphery of said ground wheel at a low angle, and the rotation of the drive wheel being in a direction which causes it to wedge itself upon the ground wheel; and said mower having a flexible connector leading from the bed plate to within reach of the operator for imparting said movement toward the ground wheel.

3. In combination with a lawn mower having ground wheels and a handle for controlling it, a power unit comprising a bed plate directly trunnioned upon the lawn mower, and a motor, said motor having a drive wheel moving by the trunnioning action of the bed plate into and out of driving contact with a ground wheel; the path of movement of said drive wheel toward the ground wheel intersecting the periphery of said ground wheel at a low angle, and the rotation of the drive wheel being in a direction which causes it to wedge itself upon the ground wheel; and said mower having a flexible connector leading from the bed plate to within reach of the operator for imparting said movement toward the ground wheel, and means tending to tip the bed plate in the direction to move the friction drive wheel from the ground wheel in opposition to said flexible connector.

4. In a power driven lawn mower, a driven wheel, a power element trunnioned on said mower and having a drive wheel, the trunnion of the power element being near to its center of gravity, the drive wheel being in a position to move into and out of contact with the driven wheel by the rocking of the power element, and means for rocking the power element; the path of movement of the drive wheel and its direction of rotation being such that the drive wheel wedges itself upon the driven wheel.

5. In a lawn mower, ground wheels, a guiding handle movable on the mower, a power unit mounted on the mower and having the drive wheel adapted to contact with a ground wheel for driving the mower, said power unit having movement on the mower for bringing said drive wheel into and out of driving relation with the ground wheel, and means through which the guiding handle, by its movement on the mower, controls the said movement of the power unit on the mower.

6. In a lawn mower, ground wheels, a power unit trunnioned upon the lawn mower and having a driving wheel which, by the trunnioning movement of the power unit, is brought into and out of driving contact with a ground wheel, control means whereby the power unit is held in position to establish the said driving contact, and a pivoted guiding handle adapted to release said driving contact without release of the control means.

7. In a lawn mower, ground wheels, a power unit trunnioned upon the lawn mower and having a driving wheel which, by the trunnioning movement of the power unit, is brought into and out of driving contact with a ground wheel, control means whereby the power unit is held in position to establish the said driving contact, and a pivoted guiding handle adapted by movement in one direction to release said driving contact without release of the control means; said control means being mounted upon said handle; and said handle, by its movement in the other direction, acting through said control means to draw the power unit to position establishing driving contact.

8. In a lawn mower, ground wheels, a power unit trunnioned upon the lawn mower and having a driving wheel which, by the trunnioning movement of the power unit, is brought into and out of driving contact with a ground wheel, control means whereby the power unit is held in position to establish the said driving contact, and a pivoted guiding handle adapted to release said driving contact without release of the control means; means being provided for normally holding said handle in position to release said driving contact.

9. In a lawn mower, ground wheels, a grinding handle having a limited movement on the mower, a power unit trunnioned on the mower and including a driving wheel movable into and out of driving contact with a ground wheel by the trunnioning movement of the power unit, and means mounted on said handle through which movement is imparted to the power unit in the direction to establish driving contact with the driving wheel, but which is effective during only a portion of the movement of the handle.

10. In a lawn mower, ground wheels, a power unit movable bodily on the mower and having a driving wheel which by its said movement is brought into and out of driving contact with the ground wheel, a guiding handle movable on the mower, and a connection between the power unit and said handle through which said handle, in its movement in one direction, moves the power unit in the direction to establish said driving contact; said handle being adapted by its movement in the opposite direction to positively move the power unit in the direction to release said driving contact.

11. In a lawn mower, ground wheels, a power unit movable bodily on the mower and having a driving wheel which by its said movement is brought into and out of driving contact with a ground wheel, a guiding handle movable on the mower, and a connection between the power unit and said handle through which the handle, in its movement in one direction, moves the power unit in the direction to establish said driving contact; said handle being adapted by its movement in the opposite direction to positively move the power unit in the direction to release said driving contact; said connection between the power unit and the handle being releasable to release driving contact independently of movement of a handle.

12. In a lawn mower, ground wheels, a power unit movable bodily on the mower and having a driving wheel which by its movement is brought into and out of driving contact with a ground wheel, a guiding handle movable on the mower, and a connection between the power unit and said handle through which said handle, in its movement in one direction, moves the power unit in the direction to establish said driving contact; said handle being adapted by its movement in the opposite direction to positively move the power unit in the direction to release said driving contact; the said connection between the power unit and said handle having inherent resiliency whereby said handle may move beyond the point at which driving contact is established.

13. In a lawn mower, ground wheels, a controlling handle, a power unit trunnioned upon the lawn mower and including a driving wheel movable into and out of driving contact with a ground wheel by the rocking of the power unit upon its trunnion, and a connector leading from the power unit to said handle adapted to rock the power unit in the direction to establish drive, and said handle being movable upon the lawn mower without releasing the connector and in a direction to separate the drive wheel from the ground wheel.

14. In a power driven lawn mower, ground wheels, a trunnioned power unit having drive wheels movable by the trunnioning of the unit into and out of driving relation to the ground wheels, a controlling handle pivoted to the lawn mower, a connector mounted on said handle and connected with the power unit to move the latter into driving relation to the ground wheels, and means for securing said connector under tension; said connector being constructed with inherent resiliency and being yieldable in length sufficiently to permit movement of the handle while holding the power unit in driving relation.

15. In a power lawn mower, ground wheels, a mower frame mounted on said ground wheels, a power element having movement on said frame and provided with a drive wheel, said power element being brought, by its said movement, into and out of driving position in which its drive wheel drives a ground wheel, means for holding the power unit in such driving position, and a guiding handle connected with said mower and having movement thereon in a path which causes it to displace the power element from its said driving position.

16. In a power lawn mower, ground wheels, a mower frame mounted on said ground wheels, a power element having movement on said frame and provided with a drive wheel, said power element being brought, by its said movement, into and out of driving position in which its drive wheel drives a ground wheel, means for holding the power unit in such driving position, and a guiding handle connected with said mower and having movement thereon in a path which causes it to displace the power element from its said driving position; the power element being trunnioned upon the frame; the handle being pivoted to the mower on an axis parallel to the trunnions of the power unit and adapted to impinge directly against the power unit in displacing the latter from driving position; and the power unit being caused to normally assume a position out of reach of the handle.

17. In a power lawn mower, ground wheels, a mower frame mounted on said ground wheels, a power element having movement on said frame and provided with a drive wheel, said power element being brought, by its said movement, into and out of driving position in which its drive wheel drives a ground wheel, means for holding the power unit in such driving position, and a guiding handle connected with said mower and having movement thereon in a path which causes it to displace the power element from its said driving position; the means for holding the power unit in driving position including a flexible connector; and said flexible connector having inherent resiliency which permits it to yield under the power unit displacement effected by the handle.

Signed at Chicago, Illinois, this 14th day of November, 1927.

MATTHEW HOWARD REED.